US010655009B1

United States Patent
Abu-Jdayil et al.

(10) Patent No.: US 10,655,009 B1
(45) Date of Patent: May 19, 2020

(54) BIODEGRADABLE COMPOSITE INSULATION MATERIAL

(71) Applicant: UNITED ARAB EMIRATES UNIVERSITY, Al Ain (AE)

(72) Inventors: Basim Abu-Jdayil, Al Ain (AE); Abdelhamid Ismail Mourad, Al Ain (AE); Mohamed Saeed Barkhed, Al Ain (AE)

(73) Assignee: United Arab Emirates University, Al-Ain (AE)

( * ) Notice: Subject to any disclaimer, the term of this patent is extended or adjusted under 35 U.S.C. 154(b) by 4 days.

(21) Appl. No.: 16/411,099

(22) Filed: May 13, 2019

(51) Int. Cl.
| | | |
|---|---|---|
| *B29B 7/92* | (2006.01) | |
| *C08L 67/04* | (2006.01) | |
| *B29B 7/90* | (2006.01) | |
| *B29C 43/00* | (2006.01) | |
| *B29C 71/02* | (2006.01) | |
| *C08L 97/02* | (2006.01) | |
| *E04B 1/76* | (2006.01) | |
| *E04B 1/74* | (2006.01) | |

(Continued)

(52) U.S. Cl.
CPC ............... *C08L 67/04* (2013.01); *B29B 7/90* (2013.01); *B29C 43/003* (2013.01); *B29C 71/02* (2013.01); *C08L 97/02* (2013.01); *E04B 1/76* (2013.01); *B29C 2071/022* (2013.01); *B29K 2067/046* (2013.01); *B29K 2511/14* (2013.01); *B29K 2995/006* (2013.01); *B29K 2995/0015* (2013.01); *C08L 2201/06* (2013.01); *E04B 2001/745* (2013.01)

(58) Field of Classification Search
CPC ....................................................... B29B 7/92
See application file for complete search history.

(56) References Cited

U.S. PATENT DOCUMENTS

| 1,468,036 A | 9/1923 | Shaw |
|---|---|---|
| 8,815,113 B2 | 8/2014 | Kostova |

(Continued)

FOREIGN PATENT DOCUMENTS

| CN | 107227006 A | 10/2017 |
|---|---|---|
| WO | 2017093865 A1 | 6/2017 |

OTHER PUBLICATIONS

Amirou. Effects of corona discharge treatment on the mechanical properties of biocomposites from polylactic acid and Algerian date palm fibres. Scientific research and essays • Jun. 2013. pp. 946-952 (Year: 2013).*

(Continued)

*Primary Examiner* — Matthew E. Hoban
(74) *Attorney, Agent, or Firm* — Richard C. Litman; Nath, Goldberg & Meyer

(57) ABSTRACT

The biodegradable composite insulation material is a composite of wood from the date palm tree (*Phoenix dactylifera*) and polylactic acid. The composite may have up to 50 wt % date palm wood powder of maximum particle size of 212 μm, the balance being polylactic acid (PLA). The composite may be prepared by melt blending the date palm wood powder with polylactic acid pellets in a twin screw extruder at 190° C., followed by compression molding the blend in a press or the like into the desired shape for building thermal insulation, and finally, annealing the molded product for three hours at 95° C. The composite material is biodegradable, thermally insulating, water-resistant and relatively strong.

1 Claim, 4 Drawing Sheets

(51) Int. Cl.
    *B29K 67/00*     (2006.01)
    *B29K 511/14*    (2006.01)

(56) References Cited

U.S. PATENT DOCUMENTS

| | | |
|---|---|---|
| 9,347,216 B2 | 5/2016 | Abu-Jdayil et al. |
| 9,902,842 B2 | 2/2018 | Alsewailem et al. |
| 2007/0259584 A1 | 11/2007 | Whitehouse |
| 2017/0218327 A1 | 8/2017 | Amstislayski et al. |
| 2017/0260694 A1 | 9/2017 | Torniainen et al. |
| 2017/0266840 A1 | 9/2017 | Ela |
| 2017/0359965 A1 | 12/2017 | Kratz et al. |

OTHER PUBLICATIONS

Bajwa. Feasibility of Reprocessing Natural Fiber Filled Poly(lactic acid) Composites: An In-Depth Investigation. Advances in Materials Science and Engineering vol. 2017, Article ID 1430892, 10 pages (Year: 2017).*

Amirou et al., "Effects of corona discharge treatment on the mechanical properties of biocomposites from polylactic acid and Algerian date palm fibres", Academic Journals (2013), vol. 8, Iss. 21, pp. 946-952.

Almi et al., "Potential utilization of date palm wood as composite reinforcement", Journal of Reinforced Plastics and Composites (2015), vol. 34, No. 15, pp. 1-10.

\* cited by examiner

BIODEGRADABLE COMPOSITE INSULATION MATERIAL

BACKGROUND OF THE INVENTION

1. Field of the Invention

The present subject matter relates to thermal insulation products and materials, and more particularly to a biodegradable composite insulation material comprising date wood and polylactic acid that has low thermal conductivity and can be utilized as a biodegradable thermal insulation material in buildings.

2. Description of the Related Art

More than 99% of plastic materials globally are based on petrochemicals. Petroleum plastic is versatile, lightweight, flexible and relatively inexpensive. Nevertheless, millions of tons of plastic packaging are landfilled every year, becoming significant sources of environmental pollution and harming wildlife when dispersed in nature. These sources became strong drivers for governments, companies, and scientists to find alternatives to petroleum-based polymers. Therefore, alternatives to petroleum-based polymers, such as bioplastics (i.e., materials that are at least partially based on biological materials, biodegradable, or both) having the above desired physical materials are desired.

Biodegradable polymers, such as aliphatic polyesters and their copolymers, are implemented in many medical and non-medical applications such as packaging, paper coatings and sustained release systems for pesticides and fertilizers. Polylactic acid (PLA) is one such commercially available biodegradable polymer often used in composite manufacturing. At the same time, natural waste fibers have been used to reinforce thermoplastics due to their low cost, low density, acceptable specific strength, thermal insulation properties, biodegradability and renewability. Moreover, PLA-based composites having natural waste fibers have been developed, including: PLA/kenaf, PLA/chicken feather, PLA/cotton, PLA/hemp, and PLA/man-made cellulose, PLA/*Arundo donax* filler (ADF), PLA/esterified lignin, and PLA/olive pit powder.

Date palms are widely produced, particularly in Arabian Gulf countries. United Arab Emirates, for example, has about 40 million date palms. Each palm generates about 15 kilograms of biomass waste annually, largely made up of date wood (DW), wherein DW may include material from the petiole, rachis, leaflets, thorns, spathe, bunch, pedicels, and fibrillium. Accordingly, DW makes up a significant source of waste or low value product at present, and represents a currently underutilized material resource.

Insulating materials used in building applications require a low thermal conductivity k, typically lower than 0.1 W/(m·K). However, typical insulation materials, e.g. polyurethane, polystyrene, and mineral wool, suffer from poor mechanical properties, which limits their application in the construction process.

Thus, a biodegradable composite insulation material solving the aforementioned problems is desired.

SUMMARY OF THE INVENTION

The biodegradable composite insulation material is a composite material comprising date wood and polylactic acid. The composite material may comprise up to 50% date wood by weight. The date wood may be in the form of date wood powder (DWP) having a maximum dimension less than about 212 µm. A process for preparing a thermal insulation material comprises mixing DWP with PLA to form a mixture; compression molding the mixture at least twice; and annealing the compressed material.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
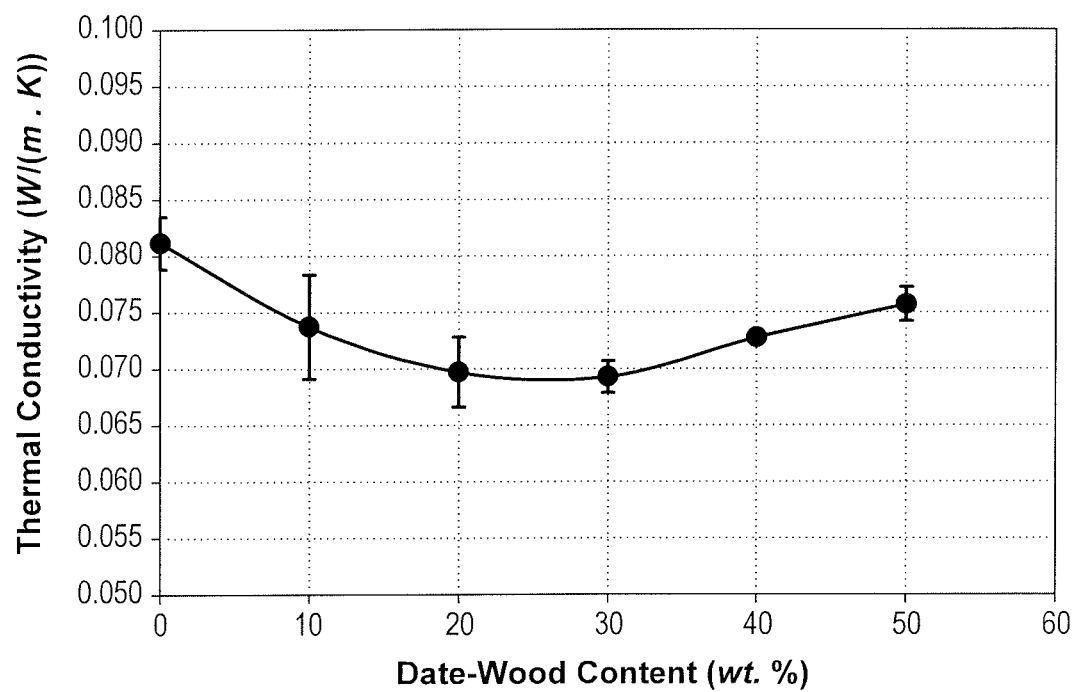
FIG. 1 shows a plot of thermal conductivity of the biodegradable composite insulation material as a function of date wood content at 298K.

The biodegradable composite insulation material is a composite of wood from the date palm tree (*Phoenix dactylifera*) and polylactic acid. The composite may have up to 50 wt % date palm wood powder of maximum particle size of 212 µm, the balance being polylactic acid (PLA). The composite may be prepared by melt blending the date palm wood powder with polylactic acid pellets in a twin screw extruder at 190° C., followed by compression molding the blend in a press or the like into the desired shape for building thermal insulation, and finally, annealing the molded product for three hours at 95° C.

As used herein, unless otherwise indicated, the term "date wood" refers to material from the petiole, rachis, leaflets, thorns, spathe, bunch, pedicels and/or fibrillium of a date tree plant, including but not limited to *Phoenix dactylifera*, which is sometimes referred to as the date palm. The composite material finds particular utility as a thermal insulator in the building and construction industry.

Date wood from any cultivar of date plant may be used in the composite. The date wood is dried and ground before use. The date wood may be ground using any suitable method available, including but not limited to the use of a ball mill, rod mill, autogenous mill, semi-autogenous (SAG) mill, pebble mill, high pressure grinding rolls, buhrstone mill, vertical shaft impactor (VSI) mill or tower mill. Preferably, the date wood is ground and optionally filtered (e.g., by mesh straining) such that the resulting date wood powder has particles with a maximum dimension of less than 212 µm.

The level of date wood in the composite material may be varied in order to modify the properties of the material as required. Typically, the composite material will comprise up to 50 wt % date wood.

Polylactic acid is commercially available from a number of suppliers. It may be provided in solid form, as crystalline, semi-crystalline or amorphous. Preferably, the polylactic acid is a semi-crystalline polylactic acid in any form appropriate for use in an extruder or a compression mold, such as pellets, flakes, powder or granules. The polylactic acid may be dried before use in the composite material.

The following examples will further illustrate the process for the preparation of the composite material and properties thereof.

Example 1

Synthesis of Biodegradable Composite Insulation Material

Polylactic acid (PLA) in the form of semi-crystalline PLA 4032D was used in the following examples, supplied by Zhejiang Zhongfu Industrial Limited (Zhejiang, China). PLA 4032D was supplied in pellet form with an L-lactide:D-lactide ratio from 24:1 to 32:1, as reported by the manufacturer, and a molecular weight of $2.41 \times 10^5$ g/mol. The specific gravity of the PLA was reported as 1.24, and the melting point varied between 155-170° C. The average diameter size of the PLA pellets was 3.5 mm.

The date wood (DW) in the following examples was obtained as date palm waste from date palm trees grown at the UAE University farm in Al Foha, UAE. In particular, the date palm waste used in the following examples was a mixture of three components of typical date palm waste, namely, leaflets, rachis, and fiber. The date palm wood was dried for a week at 90° C. in order to minimize moisture content. The dried date wood was crushed and ground using a commercial milling machine, and then it was sieved (i.e., mesh-strained) to remove particles with a maximum dimension greater than 212 μm.

The composite material was prepared as follows. PLA pellets were dried for two hours under vacuum at 90° C., and then placed in a desiccator for one hour prior to processing. DW was dried for a week at 90° C. to eliminate moisture. The dried DW was crushed, ground and mesh-strained to provide a DWP (date wood powder) with particles having a maximum dimension of 212 μm. DWP at various weight percentages from 0 wt % (control) to 50 wt % was mixed with PLA by a mini-twin conical screw extruder (MiniLab Haake Rheomex CTW5, Germany) and poured into a steel mold coated with a Maximum Mold Release Wax, with mixing conditions: 190° C., 140 RPM for 3 minutes with a total batch size of 5 g. The steel mold was transferred to a compression molding machine.

The protocol for compression molding depends upon the desired shape of the thermal insulation material. For the following mechanical and water retention testing, the composite material was molded into the shape of a cylinder as follows. Three cycles of compression molding were performed, including (i) 0.5 ton force applied at 180° C. for 16 minutes; (ii) 0.52 ton force applied at 185° C. for 10 minutes; and (iii) 3 ton force applied at 100° C. for 3:30 minutes. For thermal conductivity samples where the material was less thick, the compression molding protocol was modified as follows. Three cycles of compression molding were performed, including (i) 0.5 ton force applied at 180° C. for 5:20 minutes; (ii) 0.52 ton force applied at 185° C. for 4 minutes; and (iii) 3 ton force applied at 100° C. for 3:30 minutes.

After compression molding, the samples were annealed by transferring the material from the molding machine to an oven and maintaining the temperature at 95° C. for about 3 hours. The annealing step helps to optimize the thermal insulation properties of the composite by minimizing crystal formation.

The biodegradable composite insulation material, prepared as described above, was tested and evaluated using the following equipment and protocols. A thermal conductivity testing machine, Lasercomp FOX-200, was used to measure the thermal conductivity of the exemplary samples. A specific mold was fabricated according to the dimensions of the sample required by the Lasercomp heat-flow instrument. The dimensions of the samples were 110 mm×110 mm×3 mm. The measurement conditions follow the standard methods reported by ASTM C1045-07. The steady state method was used in these measurements, where the thermal conductivity was determined from measurements of the temperature gradient in the sample and the heat input. Each reported result is an average of three measurements.

The bulk density of the exemplary prepared composites was measured on cylindrical specimens with 25.7 mm length and 12.3 mm diameter. The density was calculated as the ratio of specimen weight to specimen volume, wherein the mass determination was carried out by weighing the specimens on an analytical balance. For all specimens, the average of three measurements was reported.

The water retention of each sample was measured in accordance with ASTM D570-98. Cylindrical specimens with 25.7 mm length, 12.3 mm diameter were prepared for this test. All the specimens were dried in an oven at 80° C. for four hours and then moved into a desiccator until a constant weight was achieved, which was taken as an initial weight $W\_i$. Then, each specimen was immersed in distilled water at either 25° C. or 50° C. for 24 hrs, i.e., the specimen was placed in a container of water, resting on an edge and entirely immersed. At the end of 24 hours, the sample was removed from the water, wiped free of surface moisture with a dry cloth, and weighed to the nearest 0.001 g immediately. The amount of water absorbed by the specimen was calculated using the following equation:

$$WR\ \% = [(W\_f - W\_i)/W\_i] \times 100$$

where WR % is the percentage of water retention by the specimen, and $W\_i$ and $W\_f$ are the weight of the specimen before and after immersion in distilled water, respectively. The average of three measurements is reported for each specimen.

The compression test was done in accordance with ASTM D695-15. Compressive strength, modulus and elongation at break of each sample were measured via a universal testing machine (MTS model MH/20) with a load cell capacity of 100 kN. Three cylindrical specimens of 25.7 mm length and 12.3 mm diameter were prepared for each DW content level tested (0, 10, 20, 30, 40, and 50 wt %). Each specimen was compressed between the upper (movable) and lower (fixed) plates of the machine. Loading was increased until either fracture of the specimen occurred or a load value of 90% of the maximum load was reached. Otherwise, the test was interrupted manually when a specific contraction value was reached. All tests were conducted at room temperature and with an overhead speed of 1.3 mm/min. The average of three measurements is reported.

The examination of pure PLA samples and composite material microstructure was carried out using a JEOL-JCM 5000 NeoScope Scanning Electron Microscope (SEM). Samples were mounted on aluminum stubs and coated by gold to eliminate electrostatic charge during imaging and to achieve maximum magnification of textural and morphological characteristics. Images were taken at multiple resolutions.

Differential scanning calorimetry (DSC) was performed on the samples prepared as above and control samples of pure PLA prepared as above, but annealed for various times.

Example 2

Thermal Conductivity

As shown in FIG. 1, the DW-PLA composite material, prepared as above, had low thermal conductivity (e.g., 0.0693 W/(m·K) for 30 wt % DW:PLA composite at 298K) and relatively high mechanical properties. For reference, typical insulating materials used in building applications have a thermal conductivity k typically lower than 0.1 W/(m·K). The present composite has the additional feature of being a biodegradable insulation material and a thermal conductivity lower than that many known insulation materials. Furthermore, regarding mechanical strength, the present composite has a significantly improved mechanical strength over typical insulation materials, rendering it particularly applicable to use in building construction.

Figure 2:
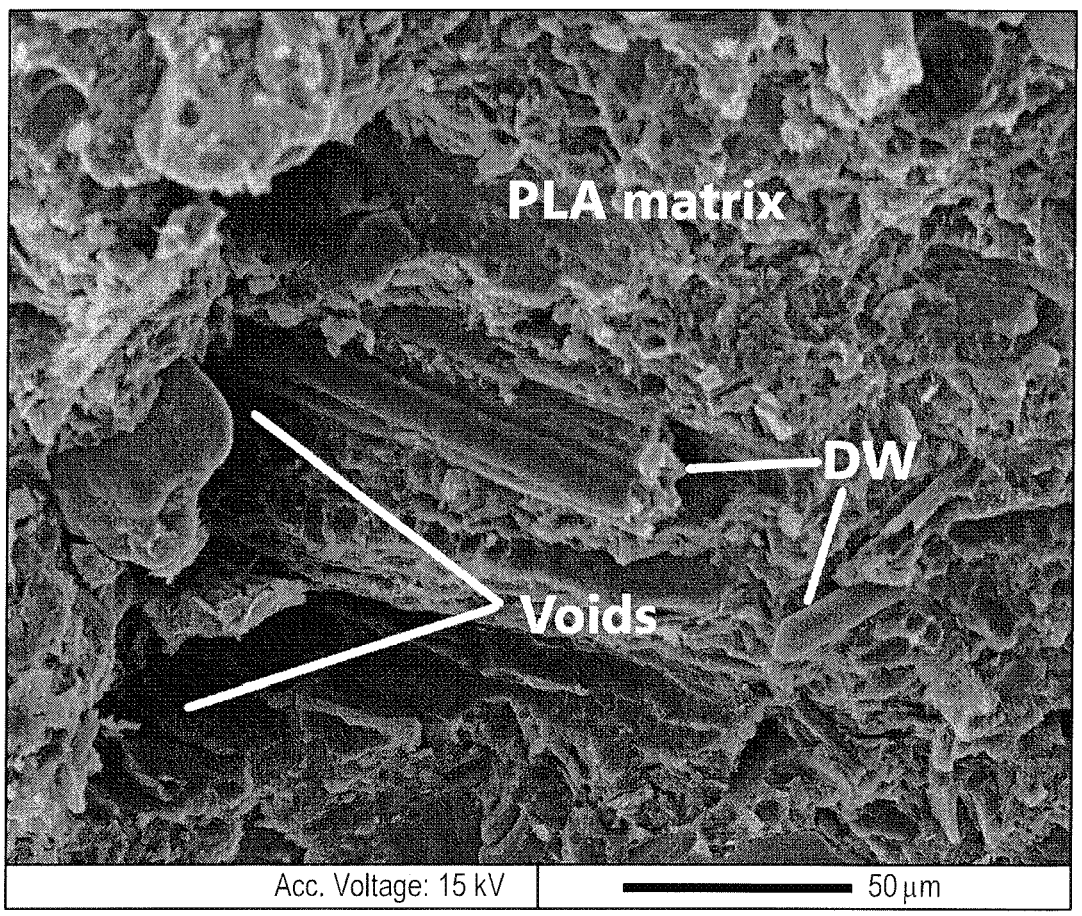
FIG. 2 is a scanning electron microscope (SEM) image of a biodegradable composite insulation material having 50 wt % date wood content, the balance being polylactic acid (PLA).

Two competing factors may affect the trend of thermal conductivity for the present DW-PLA composites with respect to DW content. These are the content of DW and the number of air voids in the composites. The k value of DW waste was measured to be (0.0626 W/(m·K)), which is significantly lower than that of PLA alone. Therefore, increasing the concentration of DW in the DW-PLA composite leads to agglomeration of DW, which reduces air voids (see FIG. 2), which may be what leads to a slight increase in thermal conductivity at high DW content for the DW-PLA composites tested (see FIG. 1).

Example 3

Density

Figure 3:
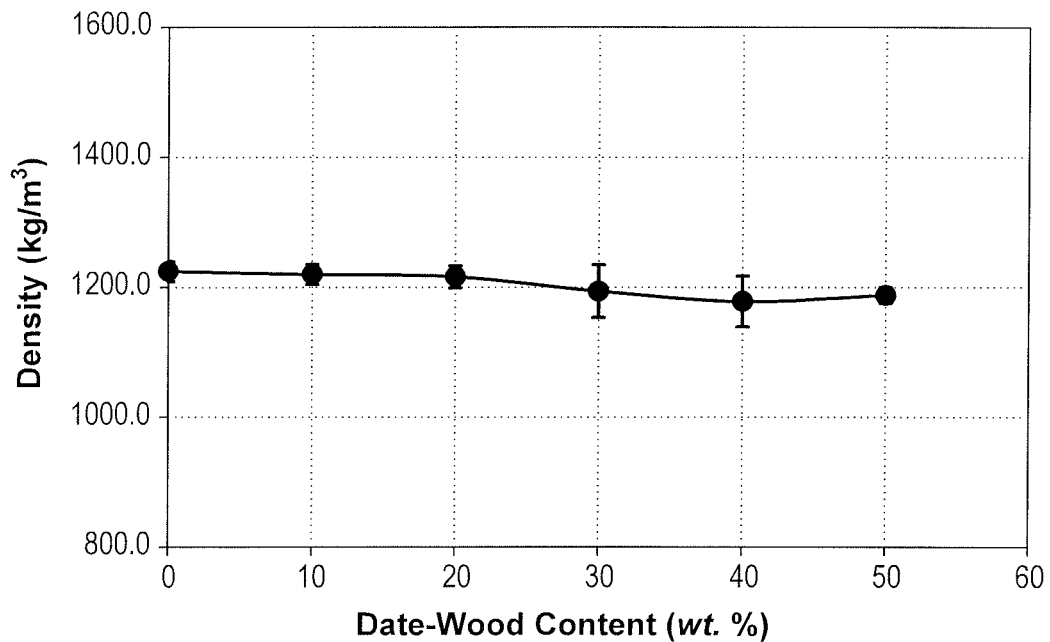
FIG. 3 is a plot of density of the biodegradable composite insulation material as a function of date wood content

FIG. 3 demonstrates the effect of DW content on the density of the DW-PLA composite. DW density was measured to be 518 kg/m$^3$, while the PLA density was measured to be 1225 kg/m$^3$. The DW-PLA composites showed a density range of 1220 kg/m$^3$ to 1188 kg/m$^3$ at 10 wt % and 50 wt % DW content, respectively. The mixing rule would have predicted densities of 1154 kg/m$^3$ and 871 kg/m$^3$, respectively, and is therefore not valid for the present composite.

Example 4

Water Retention

Figure 4:
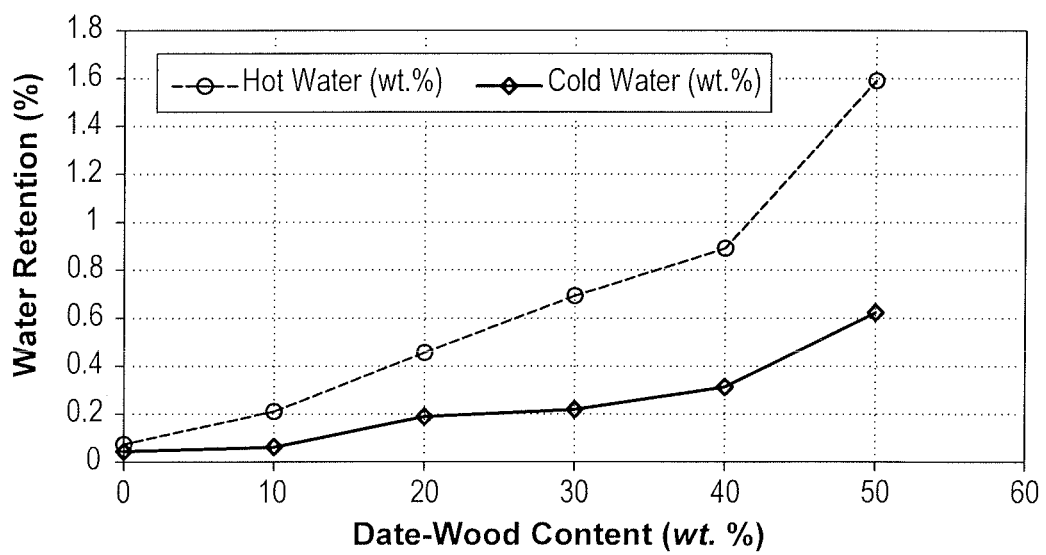
FIG. 4 is a plot of water retention (%) of the biodegradable composite insulation material as a function of date wood content.

FIG. 4 shows the water retention behavior of the DW-PLA composites after 24 hours immersion. In cold water (25° C.) tests, the water retention values for the 10 wt % DW, 20 wt % DW, 30 wt % DW, 40 wt % DW and 50 wt % DW composites were 0.0633%, 0.190%, 0.219%, 0.313% and 0.623%, respectively. The water retention among samples submerged in hot water (50° C.) was higher than for those submerged in cold water. FIG. 4 shows also that water retention increases with increasing DW content. Generally, the water retention behavior of the DW-PLA composite is very low, which is a big advantage over other thermal insulation materials, including some polyurethanes (after 24 h: 1%-6%), and materials reinforced with mineral wool and sisal (after 24 h: 10%-18%).

Example 5

Compression Testing

Figure 5:
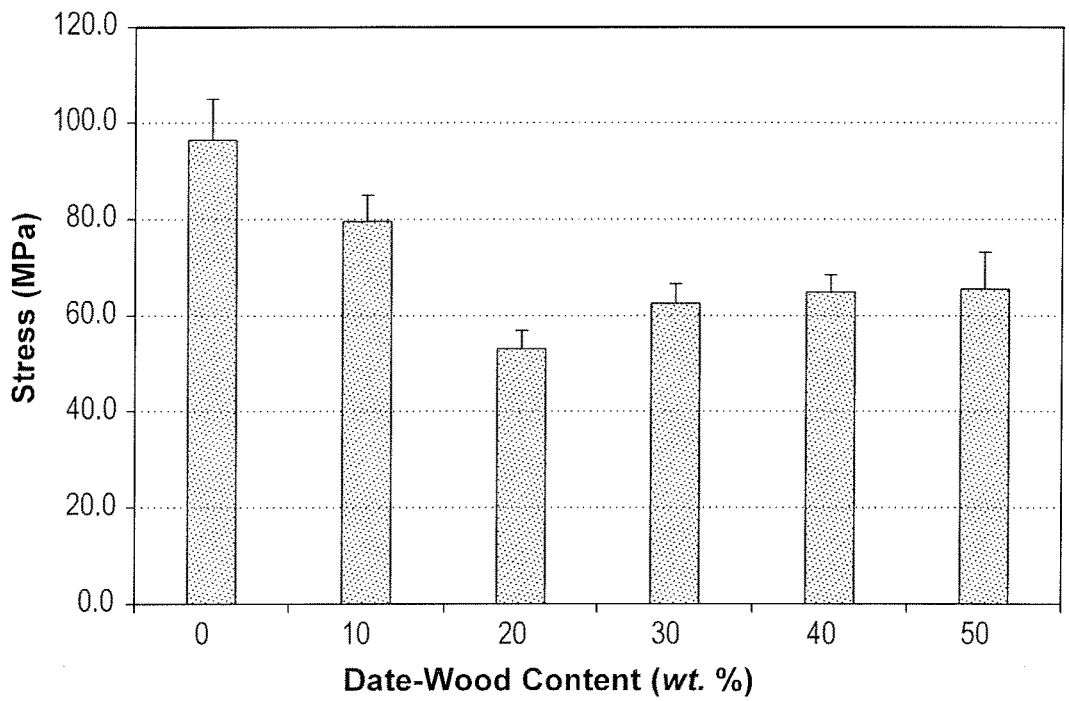
FIG. 5 is a chart of compression strength (stress) of the biodegradable composite insulation material as a function of date wood content.

FIG. 5 shows compression strength of the present composites as a function of filler content. The pure PLA sample strength was measured to be 96.35 MPa. Adding the DW to the PLA matrix produced samples with compression strength varying from 53 MPa to 80.0 MPa. The 50 wt % DW-PLA composite sample showed on average a compressive strength of 65.5 MPa. The achieved compression strengths were significantly higher than those of other typical insulation materials (2 MPa to 10 MPa) and comparable with typical building materials.

Figure 6:
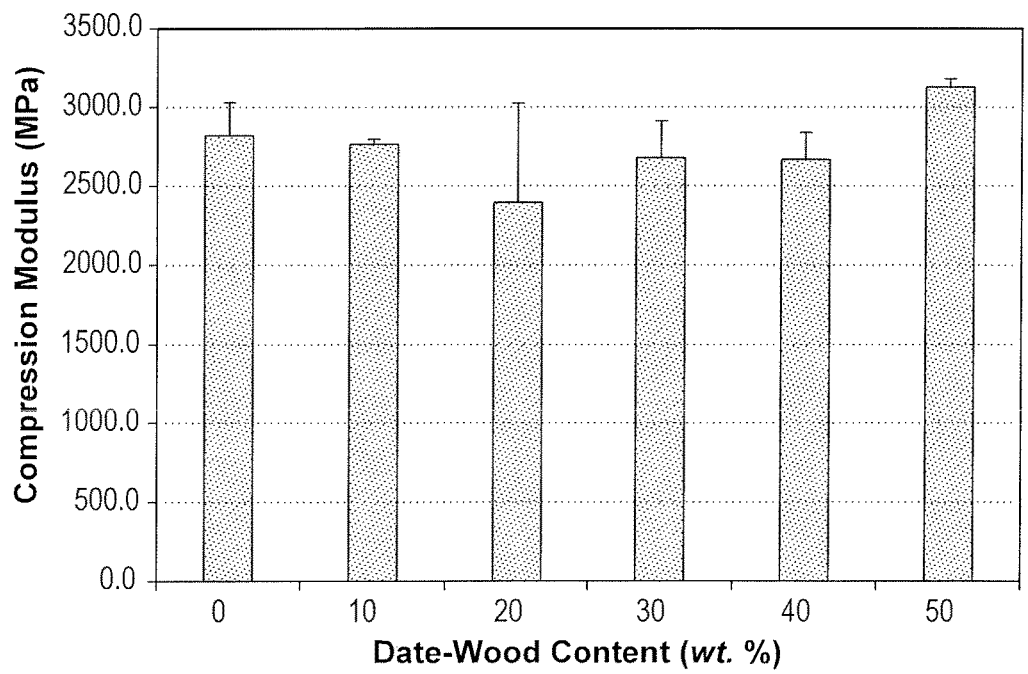
FIG. 6 is a chart of compression modulus of the biodegradable composite insulation material as a function of date wood content.

FIG. 6 shows that the compression modulus initially decreases from that of pure PLA with the addition of DW, reaching a minimum of a 15% decrease at 20 wt % DW content. Adding further DW increases the compression modulus, reaching an 11% (2.82 GPa) increased modulus over pure PLA for the 50 wt % DW composite sample. These results indicate the composite becomes progressively less plastic and more resistant to deformation relative to pure PLA with increasing DW content. In general, the compression modulus for DW-PLA composites fell in the range between 2.87 GPa and 2.4 GPa, as shown in FIG. 6.

In general, the nonlinear relations between DW content and the respective physical properties of the composites in FIGS. 1 and 3-6 make the presently disclosed composite particularly suitable to a variety of applications, depending on whether thermal conductivity or mechanical strength or plasticity is desired to be optimized. Based on the surprising trends depicted in the Figures and discussed above, one skilled in the art would understand that certain DW contents would be particularly and unexpectedly suitable for various optimizations.

Example 6

Crystallinity

Annealing optimized crystal formation in light of mechanical properties for thermal insulation properties. For a thermal insulation material, minimal crystal formation should correspond to minimal thermal conductivity. At the same time, maximal mechanical strength is desired. Optimization was performed on pure PLA samples, as PLA is presumably responsible for crystallization. The following Table 1 shows how the degree of crystallinity ($X_c$), thermal conductivity and compressive strength changes with annealing time at 95° C.

TABLE 1

PLA Annealing times vs. crystallinity, thermal conductivity and strength

| Annealing Process Intervals (hrs) | $X_c$ (%) | k (W/m·K) | Compressive strength (MPa) |
|---|---|---|---|
| 0.0 (fast cooling) | 33.8 | 0.064 | 58.9 |
| 1 | 51.3 | 0.080 | 90.2 |
| 3 | 54.1 | 0.086 | 99.0 |
| 17 | 64.8 | 0.089 | 101.2 |
| 24 | 68.4 | 0.091 | 108.4 |

Based on the above results, a 3 hr annealing time provides optimal strength and thermal conductivity. High annealing time (e.g., 24 hrs) does not significantly increase mechanical strength, particularly relative to the amount of energy and time consumed. Low annealing time (fast cooling) produces very brittle material.

DSC measurements in the following Table 2 shows how the degree of crystallinity ($X\_c$) of DW-PLA composites decreases with DW content:

TABLE 2

| DW-PLA composites annealed at 95° C. for 3 hrs | |
|---|---|
| DW Content (wt. %) | $X_c$ (%) |
| Pure PLA | 54.1 |
| 10.0 | 58.7 |
| 20.0 | 48.1 |
| 30.0 | 46.3 |
| 40.0 | 33.2 |
| 50.0 | 32.7 |

It is to be understood that the present subject matter is not limited to the embodiments described above, but encompasses any and all embodiments within the scope of the following claims.

We claim:

1. A compression molded, blended, annealed biodegradable composite insulation material, consisting essentially of a composite of:
   date palm tree wood, wherein the composite comprises up to 50 wt % date palm tree wood; and
   polylactic acid, wherein the composite comprises particles of date palm tree wood powder embedded in a matrix of polylactic acid to form a blended mixture, the date palm tree wood particles have a diameter less than 212 μm,
   wherein the blended mixture is compression molded and annealed to form the composite insulation material, further wherein the compression molding includes a plurality of cycles at temperatures between 100° C. and 185° C. and pressures between 0.5 tons and 3 tons and the annealing is in an oven at 95° C. for three hours.

* * * * *